Nov. 18, 1969   H. S. ACHLER ET AL   3,478,555
TWO-ROLL MACHINE FOR ROLLING SHEET METAL
Filed Dec. 15, 1966

INVENTORS
HOWARD S. ACHLER &
HAROLD KAUFMANN
BY Bair, Freeman &
Molinare
ATTORNEYS …

United States Patent Office 3,478,555
Patented Nov. 18, 1969

3,478,555
TWO-ROLL MACHINE FOR ROLLING SHEET METAL
Howard S. Achler, Chicago, and Harold Kaufmann, Homewood, Ill., assignors to Kaufmann Tool and Engineering Corp., a corporation of Illinois
Continuation-in-part of applications Ser. No. 357,413, Apr. 6, 1964, and Ser. No. 512,710, Dec. 9, 1965. This application Dec. 15, 1966, Ser. No. 602,068
Int. Cl. B21d 5/14
U.S. Cl. 72—166     4 Claims

ABSTRACT OF THE DISCLOSURE

A two-roll machine for rolling sheet metal, such as steel in gauge sizes and up to a maximum of about ⅜ inch thickness, utilizes one roller with a relatively deformable urethane rubber periphery and a second roller with a relatively hard periphery, the rollers being forced against each other to develop the pressures needed to deform the sheet metal during the rolling operation. For increasing the capacity of the two rollers to cause the requisite degree of deformation of the urethane rubber necessary to effect the desired rolling, a plurality of uniformly spaced annular spaces, or voids, are provided in the periphery of the urethane rubber.

Cross-references to related applications

This invention is an improvement over the machines disclosed in co-pending applications, Ser. No. 357,413, filed Apr. 6, 1964, now Patent 3,304,757, and Ser. No. 512,710, filed Dec. 9, 1965, now Patent 3,371,513, and this application constitutes a continuation-in-part of said applications as to all matter in this application that is common to matter disclosed in said prior applications.

Background of the invention

*Field of the invention.*—This invention relates to rolling machines, particularly machines for rolling sheet metal with the use of only two rollers.

*Description of the prior art.*—In rolling machines prior to the advent of two-roll rolling machines as described in said co-pending applications, it was the practice to use three or more rollers. In said co-pending applications, successful two-roll rolling machines are disclosed which use a driven roller with a relatively deformable periphery of urethane rubber and an idling roller with a relatively rigid periphery.

In two-roll type rolling machines that use urethane rubber as the periphery of one of the rolls for rolling sheet metal, the pressure developed in the urethane rubber is transmitted in all directions substantially uniformly, and the rollers' capability of effecting a substantial bend in the sheet metal is a function, to a large extent, of the degree of deformation achieved in the urethane rubber. The greater the degree of deformation achieved in the urethane rubber, the greater the bend. However, when using rollers of urethane rubber, if one wants to achieve a greater deformation in the urethane rubber, a greater force is usually required between the two rollers.

It would be desirable for flexibility of use of a two-roll rolling machine to be abel to achieve greater bends in a sheet of metal of given thickness without having to increase the force applying capacity of the machine.

Thus, the object of this invention is to provide a two-roll roller machine having increased flexibility by being able to achieve greater bends (i.e., bends of smaller radius of curvature) in a sheet of metal of given thickness without having to increase the force applying capacity of the machine.

It has been discovered that in two-roll rolling machines, greater bends (i.e., bends with a smaller radius of curvature) may be achieved by the same force applied between rollers of the same size, if the degree of deformation of the urethane rubber periphery can be increased, so that a longer arc of the sheet being bent is engaged by the urethane rubber during the rolling operation.

Accordingly, another object of this invention is to provide a simple modification of the urethane roller of a two-roll rolling machine by means of which the bend obtained in a given sheet of material may be increased without having to increase the pressing force developed by the machine.

The improvement herein is achieved by removing portions of the material layer defining the deformable periphery of the one roller so as to provide spaces into which the deformable material may move during pressurization of the material, thereby permitting increased deforming of the material for a given bending pressure. The removal of portions of material is preferably effected uniformly by a series of axially spaced annular peripheral recesses defined in the one roller.

Further objects and advantages of this invention will become apparent as the following description proceeds and the features of novelty which characterize this invention will be pointed out with particularity in the claims annexed to and forming part of this specification.

Preferred embodiments of the invention are shown in the accompanying drawing.

Description of the preferred embodiments

Figure 1:
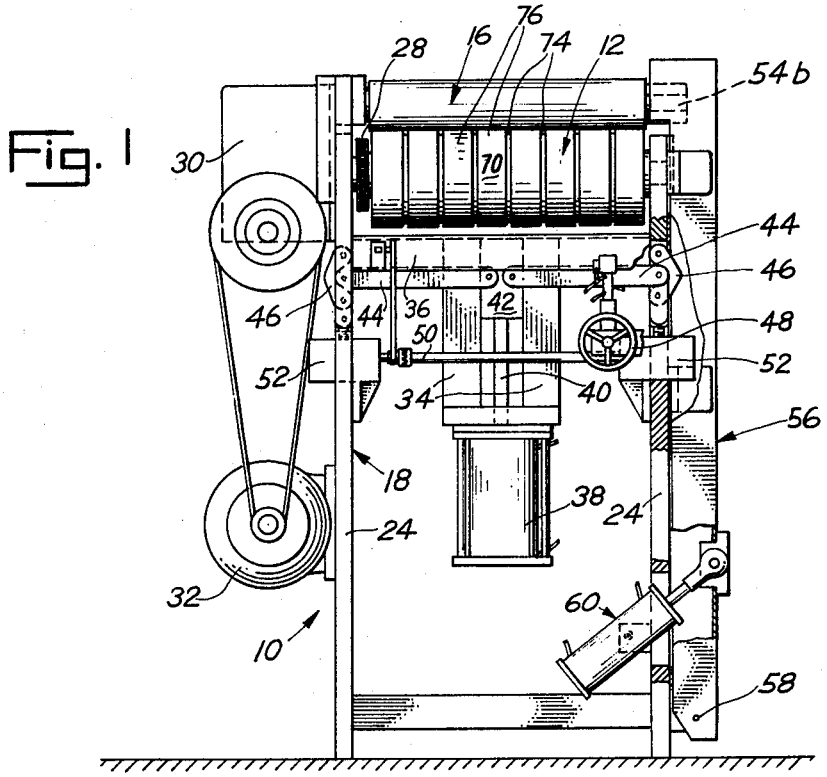
FIG. 1 is a front elevation view of a typical two-roll rolling machine embodying the improvement disclosed in the application.

Referring now to the drawings there is shown a two-roll rolling machine 10 having a driven first roller 12 that has a relatively deformable periphery, an idling second roller 16 with a relatively rigid periphery, means such as the frame 18 for maintaining the axes of the rollers 12 and 14 at a fixed spacing, and with the rollers arranged so that when a metal sheet passes between the rollers, the movement of the metal sheet as driven by the powered first roller 12 causes the rigid periphery roller 16 to rotate and the rollers then operate to roll the sheet of metal, such as steel in thicknesses in the range of gauge sizes, into an arcuate form with virtually unnoticeable flats.

More specifically, the machine 10 is of the drop-end type as disclosed in the said co-pending application, Ser. No. 512,710. The first roller 12 includes an elongated roller support shaft 20 preferably of anti-deflection construction and character whose ends are carried by supports 22 that are slidable relative to structural uprights 24. Bearings 25 on shaft 20 support a tubular structural sleeve 26 of steel or the like that carries a sleeve-like body of relatively deformable material, and with said sleeve 26 having drivingly connected thereto a sprocket 28 over which may be trained a chain (not shown) for transmitting power from a gear reducer 30 driven by an electric motor 32 mounted on one upright 24.

A pressure-applying means is carried by frame members 34 and 36 supported between uprights 24, and includes hydraulic cylinder 38, slidable piston 40, and a piston-block 42 which connects by links 44 and toggles 46 to supports 22 for the first roller 12. A hand wheel 48 accurately and simultaneously controls, through a gear driven shaft 50 and geared connectors housed in boxes 52 on uprights 24, the relative positioning of the toggles 46 so as to permit selective spacing of the axis of shaft 20 relative to the axis of the second roller 16, so as to vary the pressures developed between the first and second rollers 12 and 16. The structural arrangement provides means for maintaining a fixed pre-selected spacing between the axes of the rollers 12 and 16.

Figure 2:
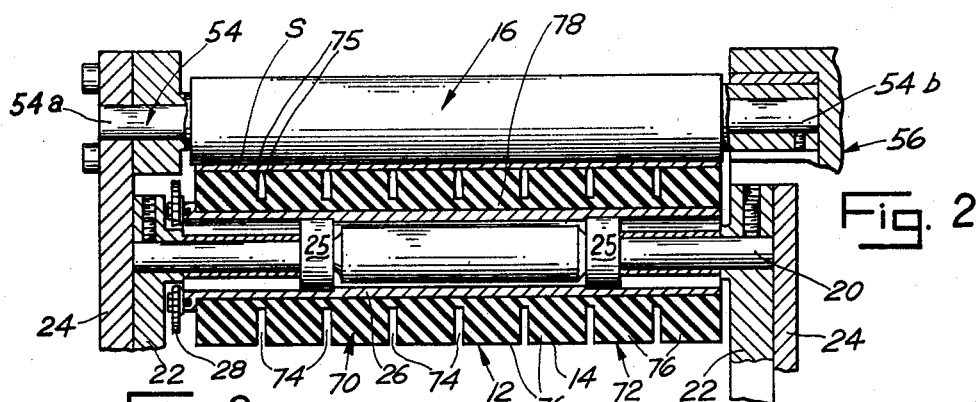
FIG. 2 is an enlarged fragmentary view, partly in cross-section in the vertical axial plane of the rollers of the machine shown in FIG. 1.

The second roller 16 includes an elongated support shaft 54 with one end 54a carried in one structural upright 24 and with the other end 54b arranged to be selectively engaged with (as seen in FIGS. 1 and 2) or freed from an elongated drop-end member 56 that is pivotly mounted at 58 on the other structural upright 24 and is arranged to be swung between its said selective positions by a hydraulic cylinder motor 60.

Thus far what has been described has been disclosed in one or the other of said co-pending patent applications. What is new in this application and the theory of its operation will be described hereinafter.

The first roller 12 is, as previously stated, provided with a sleeve-like body of relatively deformable material, and it will be understood that when the two rollers 12 and 16 are pressed toward each other with a sheet of metal passing therebetween, there is developed a generally radial pressure accompanied by deformation in the periphery of the sleeve of deformable material which operates to effect the bending or rolling of the sheet of metal. What really occurs is that the relatively deformable periphery of roller 12 in the immediate vicinity of the point where the metal sheet is passing between the rollers cups to an arcuate shape to generally conform to the periphery of the second roller 16, and with the metal sheet being forced to pass between the female die defined by the cupped portion of the periphery of roller 12 and the male die defined by the rigid periphery of roller 16, rolling of the sheet is effected.

However, mere deformation of the periphery of roller 12 is not enough for bending, as pressure is required on both sides of the sheet of metal to effect proper bending. The use of urethane rubber or its equivalent is essential, because urethane rubber has the desired property, not possessed by natural rubber, of transmitting local pressures substantially undiminished and uniformly in all directions so that such material actually acts, in its pressure-transmitting aspect, almost as a liquid in the form of a solid. This very characteristic which is so essential to the success of a two-roll roller machine also presents the problem which this invention solves.

Since urethane rubber transmits local pressures substantially undiminished and uniformly in all directions, the creation of large radial pressures in a solid cylindrical sleeve of urethane rubber creates equally large pressures in axial directions within the sleeve itself, and this is compounded by the fact that except at the ends of the sleeve the pressurized material has no place to move to in axial directions. Such coincidence of factors operates to create a situation where the sleeve of urethane rubber, itself, provides enormous resistance to deformation under radial pressures, and if a two-roll rolling machine is to provide the necessary radial pressures, it must also work that much harder to overcome the resistance to deformation provided by the sleeve of deformable material.

Luckily, there has been discovered a solution to the foregoing problems, which solution consists in substantially reducing the resistance to axial deformation in the deformable periphery of the roller while retaining substantially the full ability of the deformable material to act in a radial direction as if it were a solid sleeve of deformable material.

Thus, as seen in FIGS. 1 and 2, the tubular structural sleeve 26 is provided with a sleeve means 70 of a deformable material, preferably of urethane rubber. The exterior periphery of sleeve means 70 is the plane of the cylindrical surface 72. The sleeve means 70 is not in the form of a solid cylinder of material. It will be seen that portions of the periphery of sleeve means 70 have been removed to provide spaces 74 into which the deformable urethane rubber at the outer radial regions of sleeve means 70 may flow axially when under the stress of a deforming radial pressure applied between rollers 12 and 16.

More specifically, the sleeve means 70 in the first form of construction is a unitary body that is provided with a series of annular circumferential grooves that are equally spaced axially of the sleeve means and which define the voids or recesses 74. Such construction provides a plurality of lands 76 of equal axial length that are equally spaced axially in an amount equal to the width of recess 74, and which are all joined together by an innermost continuous sleeve-like section 78. The recesses 74 may either be cut into a solid cylinder of the urethane rubber or may be preformed such as by molding.

Figure 3:
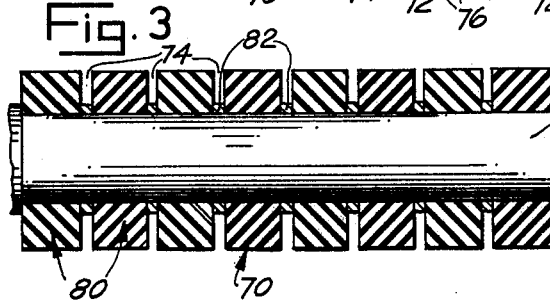
FIG. 3 illustrates a modified form of the invention.

In the second form of construction seen in FIG. 3, the sleeve means 70 is defined by a plurality of annular pieces 80 of urethane rubber spaced at their inner edges by ring-like spacers 82 that slide onto structural sleeve 26 of roller 12. One advantage in this form of construction is that if one of the pieces 80 should become damaged, it can be replaced without discarding the other pieces 80.

When the axial length of space 74 is small relative to the axial length of land 76 or piece 80, the plurality of lands 76 which make up the sleeve means 70 operate to provide substantially the same desirable results as obtained by a solid sleeve of urethane rubber, but the work and pressure necessary to be produced by the machine 10 to effect bending of a metal sheet is much less than with a solid sleeve of urethane rubber.

The axial length of space 74 may vary, depending upon the nature of the sheet metal being rolled and the pressures required to be applied. Two roller machines of the type here disclosed have been constructed to effect rolling of sheet steel in gauge sizes and up to a maximum of about ⅜" thick. The maximum axial length of slots 74 in such machines is in the range of about ¼ inch. The radial length of slots 74 may vary widely, but at a minimum the slots should be about ¼ inch deep. FIG. 2 illustrates how portions of sleeve means 70, which engage a sheet S that is being rolled, deforms laterally at 75 to extend into space 74. It will further be understood that the number of lands 76 is always one greater than the number of slots 74.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new and desire to secure by Letters Patent of the United States is:

1. In a two-roll sheet metal rolling machine of the type utilizing a first roll with a relatively deformable periphery and a second roll of a relatively rigid periphery, the improvement characterized by the feature that the first roll provides axially-elongated, circumferentially-continuous, cylindrical periphery means of resilient material arranged to rotate past a station at which pressure is applied from the second roll radially inwardly of the first roll to cause said resilient cylindrical periphery to be locally and temporarily deformed so as to provide, along a region extending axially of the first roll an arc shape substantially conforming to the periphery of this second roll and which cooperates with the second roll to effect rolling of the sheet metal to a desired radius of curvature, and portions of said resilient periphery being removed along only a plurality of spaced circumferential lines to provide annular spaces into which portions of the deformable material may flow when pressure is applied radially to the said first roll.

2. A machine as in claim 1 wherein the deformable periphery means of the first roll includes a resilient sleeve means of urethane rubber constructed to provide a plurality of lands each providing an uninterrupted cylindrical outer periphery and each of substantially equal width, and the lands being alternated with grooves each of substantially equal width and radial depth.

3. A machine as in claim 1 wherein the deformable periphery means of the first roll is provided by a plurality of substantially identical annular pieces of urethane rubber each having a continuous cylindrical exterior periphery, and means for maintaining said annular pieces spaced substantially equal distances axially of each other.

4. A two-roller machine, for rolling, by utilization of only two rollers to roll into arcuate form sheet metal, such as steel, having thicknesses in the range of gauge sizes; said two-roller machine comprising, in combination: first roller means providing a sheet metal engaging periphery of urethane rubber; second roller means including a roller with a relatively rigid periphery; means for maintaining a fixed pre-selected spacing between the axes of said first and second roller means, so that said periphery of urethane rubber is caused to deform and acts to roll the sheet metal passing between said roller means to a desired final arcuate form with substantially uniform radius of curvature and with relatively no flats; drive means coupled to only said first roller means for selectively rotating said first roller means; the hard periphery roller of the second roller means being caused to rotate by the relative movement of a metal sheet as it passes between said first and second roller means; and the urethane rubber periphery of the first roller means having portions thereof removed to provide spaces into which the urethane rubber may flow when pressure is applied radially to said first roller means.

References Cited
UNITED STATES PATENTS

| | | | |
|---|---|---|---|
| 2,287,768 | 6/1942 | Eckstein | 29—132 |
| 2,292,851 | 8/1942 | Tykal | 29—125 |
| 2,546,200 | 3/1951 | Snavely | 29—130 |
| 2,783,719 | 3/1957 | Rhodes | 29—125 |
| 3,042,995 | 7/1962 | Birkin | 29—132 |
| 3,344,493 | 10/1967 | Telgheider. | |
| 3,351,001 | 11/1967 | Achkio | 29—125 |
| 3,371,513 | 3/1968 | Achler et al. | 72—465 |
| 2,454,282 | 11/1948 | Johnson | 72—169 |

MILTON S. MEHR, Primary Examiner

U.S. Cl. X.R.

29—125; 72—465